United States Patent [19]

Yokota

[11] Patent Number: 4,977,450

[45] Date of Patent: Dec. 11, 1990

[54] IMAGE PICKUP SYSTEM FOR AN ENDOSCOPE USING A FIRST FILTER MATCHED TO A FREQUENCY OF A FIBER ARRAY AND A SECOND MATCHED TO A FREQUENCY OF AN IMAGE PICKUP DEVICE

[75] Inventor: Akira Yokota, Sagamihara, Japan

[73] Assignee: Olympus Optical Co., Ltd., Tokyo, Japan

[21] Appl. No.: 437,035

[22] Filed: Nov. 15, 1989

[30] Foreign Application Priority Data

Nov. 18, 1988 [JP] Japan .................................. 63-290024

[51] Int. Cl.$^5$ ........................... A61B 1/04; H04N 7/18
[52] U.S. Cl. .......................................... 358/98; 358/55;
358/225; 358/901; 128/6
[58] Field of Search ......................... 358/98, 225, 901;
350/96.26, 438, 404; 128/4, 6

[56] References Cited

U.S. PATENT DOCUMENTS

| | | |
|---|---|---|
| 4,575,193 | 3/1986 | Greivenkamp, Jr. . |
| 4,676,593 | 6/1987 | Adachi et al. . |
| 4,720,178 | 1/1988 | Nishioka et al. .................. 358/98 X |
| 4,760,839 | 8/1988 | Nagasaki . |
| 4,761,682 | 8/1988 | Asaida . |
| 4,807,981 | 2/1989 | Takizawa et al. . |
| 4,845,554 | 7/1989 | Kimura et al. ......................... 358/98 |

FOREIGN PATENT DOCUMENTS

| | | |
|---|---|---|
| 55-143125 | 11/1980 | Japan . |
| 59-71022 | 4/1984 | Japan . |
| 59-129820 | 7/1984 | Japan . |
| 59-193416 | 11/1984 | Japan . |
| 59-193417 | 11/1984 | Japan . |
| 60-76712 | 5/1985 | Japan . |
| 63-291026 | 11/1988 | Japan . |

Primary Examiner—Victor R. Kostak
Attorney, Agent, or Firm—Cushman, Darby & Cushman

[57] ABSTRACT

An image pickup system for endoscopes includes an image guide fiber bundle, a light guide fiber bundle, an imaging lens unit having optical low-pass filters, and a solid-state image pickup device. Further, a first optical low-pass filter having a spatial frequency response depending on an array of fibers of the image guide fiber bundle and a second low-pass filter having a spatial frequency response depending on a sampling frequency of the solid-state image pickup device can also be provided between the image guide fiber bundle and the solid-state image pickup device. Thus, even in the image guide fiber bundle which is different in effective diameter and core diameter and has a disorderly array of fibers, the generation of moiré can be prevented without reducing resolution.

17 Claims, 8 Drawing Sheets

IMAGE PICKUP SYSTEM FOR AN ENDOSCOPE USING A FIRST FILTER MATCHED TO A FREQUENCY OF A FIBER ARRAY AND A SECOND MATCHED TO A FREQUENCY OF AN IMAGE PICKUP DEVICE

BACKGROUND OF THE INVENTION (a) Field of the invention:

This invention relates to an image pickup system for endoscopes which, in an optical instrument provided with an image guide fiber bundle such as a fiberscope, picks up an image formed on an end face of the image guide fiber bundle.

(b) Description of the prior art:

Of recent years, it has become popular that a TV camera is attached to an eyepiece section of a fiberscope or the like to observe the body cavity with a TV monitor.

An end face of an image guide fiber bundle used in the fiberscope has a regular brightness pattern (screen dot structure) depending on a core array of fibers. With respect to the TV camera, on the other hand, in the case where a pickup tube is used and a color striped filter is provided before its light receiving surface and in the case where a solid-state image pickup device is used and a color mosaic filter is provided before it, color elements of each filter exhibit an ordered array, and even in the case where the mosaic filter is not disposed, pixel elements of the solid-state image pickup device assume an ordered array. Thus, a problem has been encountered that the preceding of the filter bundle regular structure relative to the irregular structure of the image guide fiber bundle give rise to interference of light, resulting in generation of moiré in a TV picture image. Here, the color striped filter or the color mosaic filter represents a color encoding filter configured by arraying color elements, in a stripe pattern or a mosaic pattern, composed of minute filters with additive primary colors or subtractive primary colors.

For a technology to eliminate the moiré of this type, it is known that an optical low-pass filter is provided between the exit end face of the image guide fiber bundle and the solid-state image pickup device. For example, Japanese Patent Preliminary Publication No. Sho 55-143125 sets forth the use of a phase filter as the optical low-pass filter. Further, Japanese Patent Preliminary Publication No. Sho 59-193416 makes use of a birefringent filter combined with a quartz plate as the optical low-pass filter.

However, various types of fiberscopes have been developed of late, which range, for instance, from an extremely fine one (approximately 0.5 mm in diameter) for viewing the inside of blood vessels to a considerably thick one for large intestines, thicker in endoscopes for industry. In the case where these parts are observed with the same TV camera, it is required that images are made similar in size to each other in the use of any fiberscope, so that magnification in imaging the end face of the image guide fiber bundle on the solid-state image pickup device varies widely for each fiberscope and consequently cores in each image (namely, on an image pickup surface) will largely be different in thickness from each other. This will be explained in relation to frequency domain as follows:

The solid-state image pickup device is adapted to sample an object image in a spatial frequency corresponding to the repetition period of the regular structure mentioned above. As known from communication theory, if the frequency spectrum zone of a signal to be sampled reaches the range of a high-frequency wave exceeding a Nyquist rate, what is called aliasing will be generated to bring about moiré.

In this case, the signal to be sampled represents an image formed on the exit end face of the image guide fiber bundle and, if brightness variation caused by repetition of cores is taken as a sine wave, its spatial frequency spectrum will range to the repetition frequency. Since the brightness variation is not represented by the sine wave in fact, a harmonic wave component also exists and a fundamental wave component is largest as an extent of the spectrum.

Accordingly, an interpretation may be given such that the band width of the spatial frequency spectrum of the image is substantially determined by the repetition period of cores in the image. This means that the aspect of generation of moiré is severely affected by thicknesses of cores in the image formed on the exit end face of the image guide fiber bundle which is transmitted onto the image pickup device.

Since spectrum components of the spatial frequency depending on the core period are very large, the generation of moiré is mainly attributable to such components.

The relationship between the Nyquist rate of the solid-state image pickup device and the spatial frequency of cores in the image formed on the exit end face of the image guide fiber bundle is assumed as shown in FIGS. 1 to 3.

Each of these figures represents a two-dimensional spatial frequency plane, in which reference symbol $f_H$ is the axis indicative of the frequency in a horizontal scanning direction and $f_V$ the frequency in a vertical scanning direction. The Nyquist rates in the horizontal and vertical directions of the solid-state image pickup device are taken as $f_{HN}$ and $f_{VN}$, respectively. Further, when, among the fibers used in the fiberscope, the smallest diameter is represented by $\phi$ and the largest one by $\phi'$, and when the minimum value of magnification in the case where the exit end face of the image guide fiber bundle is imaged on the solid-state image pickup device is taken as $\beta$ and the maximum one as $\beta'$, the values of the thicknesses of cores in the image formed on the solid-state image pickup device lie within the range of $\phi\beta \sim \phi'\beta'$. Thus, the spatial frequencies of cores are distributed over the range of $1/\phi'\beta' \sim 1/\phi\beta$.

Since FIG. 3 shows the example that the core frequency does not exceed the Nyquist rate (in other wards, thicker cores are imaged) and no moiré appears, it is only necessary to discuss the examples of FIGS. 1 and 2.

In the example of FIG. 1, the core spatial frequency is higher than the Nyquist rate of the solid-state image pickup device and as such, if the optical low-pass filter is provided to eliminate the spatial frequency components of cores, the generation of moiré is extremely diminished (to a practically negligible extent). The image is blurred or a multiple image whose elements are slightly shifted is formed by the optical low-pass filter in outward appearance and thereby the spaces among the cores are filled so that the screen dot structure of the cores is not viewed. Also, such a manner has little effect on the resolution of the TV picture image to be photographed since the spatial frequency components are eliminated outside the range of the Nyquist frequency of the solid-state image pickup device.

The case of FIG. 2, in which the Nyquist rate is included in the distribution band of the core spatial frequency, has problems. In this example, the core frequency $f_{IG}$ is larger than the Nyquist rate $f_{VN}$ with respect to its vertical direction, while on the other hand, in its horizontal direction, the core frequency $f_{IG}$ is smaller than the Nyquist rate $f_{HN}$, that is, the frequency domain such that the relationship of $f_{VN} < F_{IG} < f_{HN}$ is established exists. Although the core frequency in the vertical direction, like the example of FIG. 1, is favorable because the optical low-pass filter is provided such that a response is reduced to zero in the distribution band of the core spatial frequency, the response is reduced, in the horizontal direction, on the inside considerably farther (at a lower frequency) than the Nyquist rate, with the result that the reduction of resolution is inevitably brought about.

SUMMARY OF THE INVENTION

The object of the present invention, in view of the above problems, is to provide an image pickup system for endoscopes capable of preventing generation of moiré without any loss of resolution even in such a case as stated in the preceding chapter.

This object is achieved, according to the present invention, in an image pickup system provided with an objective lens forming an image of an object, an image guide fiber bundle transmitting the object image formed by the objective lens, and an imaging lens unit arranged so that the object image appearing on an exit end face of the image guide fiber bundle is reformed on a solid-state image pickup device, by providing a first optical low-pass filter having a spatial frequency response according to an array of fibers of the image guide fiber bundle and a second optical low-pass filter having a spatial frequency response according to a sampling frequency of the solid-state image pickup device, in an optical path from the exit end face of the image guide fiber bundle to the solid-state image pickup device.

A basic consideration of this arrangement will be explained by using the example of FIG. 2 below.

In FIG. 2, spatial frequencies of cores causing the generation of moiré in a vertical direction are distributed in the domain of frequencies higher than the Nyquist rate of the solid-state image pickup device.

Accordingly, if the first optical low-pass filter causes the response of an imaging optical system to be extremely diminished in the frequency domain, the generation of moiré will be minimized and the resolution of the TV picture image will not virtually be reduced.

On the other hand, if the same manner as in the vertical direction is carried out with respect to a horizontal direction, the response will be diminished to such an domain of frequencies lower than the Nyquist rate that the moiré is not caused. As such, the use of the second optical low-pass filter diminishing extremely the response with the Nyquist rate of the solid-state image pickup device makes it possible to prevent the generation of moiré without sacrificing practically resolution.

Also, if the response is reduced with the frequency of more than the Nyquist rate even in the vertical direction, the moiré may be eliminated. However, it is advisable that the response is maintained to a larger value at the highest possible frequency in order that the resolution is not reduced. Accordingly, in the case where the cause of generation of moiré is defined, like the image formed on the exit end face of the image guide fiber bundle, and the frequency is higher than the Nyquist rate, it is rather advantageous in view of the maintenance of picture quality to remove its spectrum components in the object image Thus, the first optical low-pass filter having the spatial frequency response depending on the fiber array of the image guide fiber bundle and the second low-pass filter having the spatial frequency response depending on the sampling frequency of the solid-state image pickup device are provided in the imaging optical path in combination with each other, thereby enabling the elimination of moiré to be compatible with the maintenance of resolution Although, in this explanation of the principle, the Nyquist rate of the solid-state image pickup device is assumed to include each one component in the horizontal and vertical directions for its simplification, it may vary for each color in the case where the solid-state image pickup device provided with a color mosaic filter is employed, and the sampling frequency may point an oblique direction in accordance with the array of individual color elements of the color mosaic filter. As such, spatial frequency characteristics of the optical low-pass filter need to be determined to the pattern of each regular structure of the exit end face of the image guide fiber bundle and the solid-state image pickup device The basic consideration, however, is the same in this case. Specifically, when the Nyquist rate of the color sampling in a direction of an array of specific color elements is represented by $f_{PNC}$, the Nyquist rate in a direction orthogonal thereto by $f_{SNC}$, the spatial frequency depending on an array of cores in the image of the image guide fiber bundle by $f_{IG}$ and, in accordance with the relationship of magnitude between the Nyquist rates $f_{SNC}$ and $f_{PNC}$, the spatial frequency $f_{IG}$ satisfies the following relationship:

$$f_{SNC} < f_{IG} < f_{PNC}$$

or $$f_{PNC} < f_{IG} < f_{SNC},$$

it is only necessary for one optical low-pass filter to have a spatial frequency response such as to damp the spatial frequency $f_{IG}$ and for the other optical low-pass filter to have a spatial frequency response such as to damp the Nyquist rate $f_{SNC}$ or $f_{PNC}$ higher than the spatial frequency $f_{IG}$.

According to a preferred formation of the present invention, the imaging lens unit is configured as a variable power lens and the first optical low-pass filter is arranged on an object side of the imaging lens unit.

According to another preferred formation of the present invention, the objective lens and the image guide fiber bundle are disposed inside the endoscope.

According to still another preferred formation of the present invention, the first optical low-pass filter, imaging lens unit, second optical low-pass filter, and solid-state image pickup device are provided in a TV camera independent of the endoscope.

According to a further preferred formation of the present invention, plural endoscopes can selectively be used and spatial frequencies depending on the array of cores of image guide fiber bundles of individual endoscopes are different from each other. Also, the first optical low-pass filters different in spatial frequency response for respective fiber bundles are adapted to be selectively used.

According to a still further preferred formation of the present invention, the first optical low-pass filter is arranged between the image guide fiber bundle and the imaging lens unit, which is provided in the TV camera together with the second optical low-pass filter and the solid-state image pickup device.

By such arrangements, the moiré can be eliminated without any reduction of resolution so that the effect may be achieved in the use of the image guide fiber bundle which is different in effective diameter and core diameter and disordered in fiber array.

This and other objects as well as the features and advantages of the present invention will be apparent from the following detailed description of the preferred embodiments when taken in conjunction with the accompanying drawings.

DESCRIPTION OF THE PREFERRED EMBODIMENTS

Figure 1:
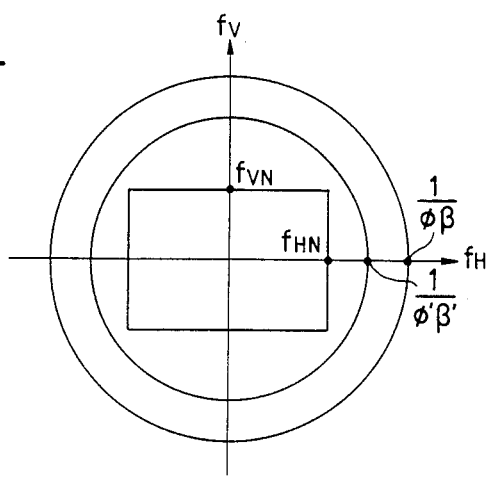
FIGS. 1 to 3 are diagrams showing relationships between the Nyquist rate of a solid-state image pickup device and the spatial frequency of cores in an image formed on the exit end face of an image guide fiber bundle in conventional image pickup devices for endoscopes.

In accordance with the embodiments shown in the drawings, the present invention will be described in detail below.

Figure 4:
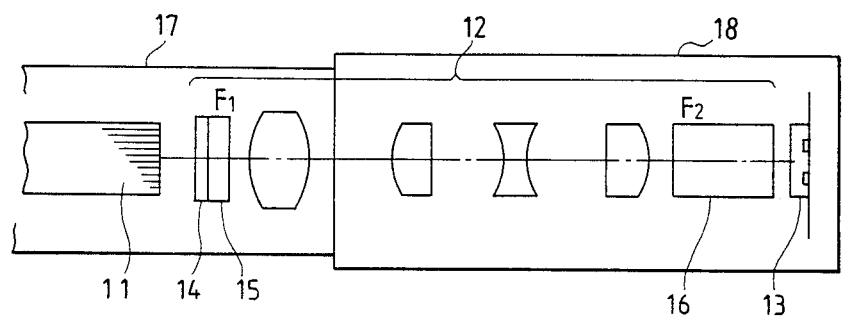
FIG. 4 is a schematic view showing the optical system of a first embodiment of an image pickup system for endoscopes according to the present invention.

FIG. 4 shows the optical system of a first embodiment, which is provided with an image guide fiber bundle assuming a disorderly array of fibers and makes imaging magnification variable.

Figure 5:
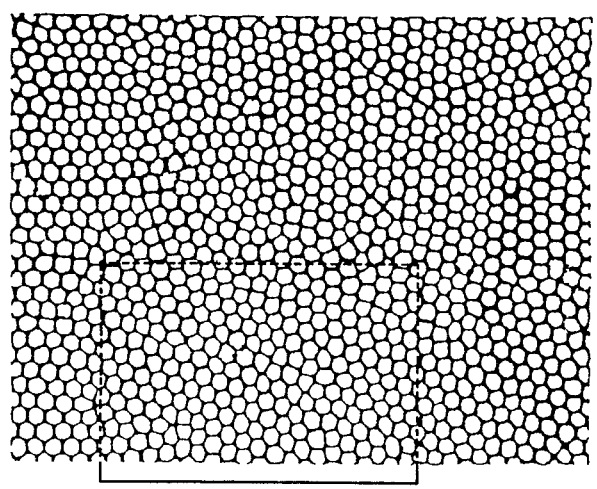
FIG. 5 is an enlarged view showing the exit end face of the image guide fiber bundle whose fiber array is disordered.

Here, an enlarged view of the exit end face of the image guide fiber bundle assuming the disordered array of fibers is depicted in FIG. 5. As seen from this figure, the image guide fiber bundle has a fiber array such that clear orderliness is not exhibited in view of the entire exit end face, although individual fibers assume an almost orderly array of a pipe stack manner within a small partial area of the exit end face. In the image guide fiber bundle of this type, since the distances between the centers of individual fibers and the array directions of the fibers vary, spatial frequency components of an image formed on the exit end face of the fiber bundle exit over the range of some frequencies corresponding to the maximum and minimum values of the center distances of individual fibers and are different in orientation given on a twodimensional spatial frequency plane. As a result, the spatial frequency components, as shown in FIG. 7 which will be described later, are distributed in an annular area with a center at the origin of coordinate on the spatial frequency plane.

To return to FIG. 4, reference numeral 11 represents an image guide fiber bundle, 12 an imaging lens unit which is a zoom lens arranged on an exit side of the image guide fiber bundle 11, and 13 a solid-state image pickup device arranged at an imaging surface of the imaging lens unit 12. Reference symbol $F_1$ represents a first optical low-pass filter disposed on an entrance side of the imaging lens unit 12 and $F_2$ a second optical low-pass filter arranged on an exit side of the imaging lens unit 12, which are constructed of quartz plates 14, 15 and a quartz plate 16, respectively. The headmost lens of the imaging lens unit 12 is an eyepiece and the arrangement is such that the eyepiece and an optical system located in front of the eyepiece are disposed in a fiberscope 17 and an optical system in rear thereof in a TV camera 18.

Figure 6A:
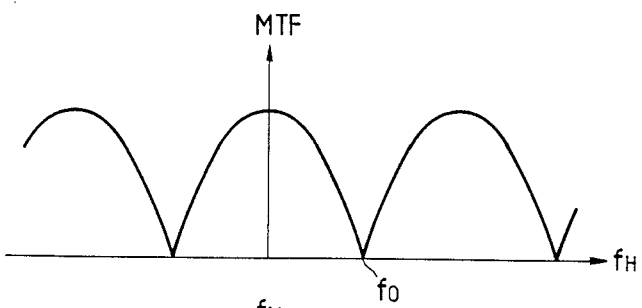
FIGS. 6A and 6B are diagrams showing the spatial frequency response of a single quartz plate.
Figure 6B:
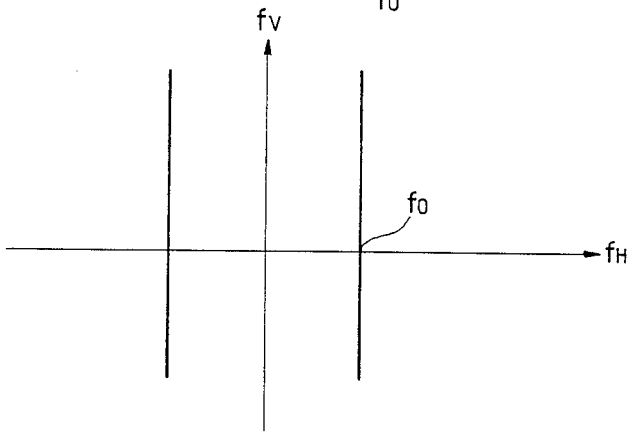

A spatial frequency response (MTF) of a single quartz plate, as shown in FIG. 6A, has the characteristic of $|\cos \theta|$ in general, which merely shows a section. Specifically, if the response is taken perpendicular to the plane of the drawing and the spatial frequency is represented by the two-dimensional plane as depicted in FIG. 6B, the frequency whose response is reduced to zero will lie on a straight line. An intersection of this line (termed a trap line) with a horizontal frequency axis $f_H$ is represented by symbol $f_O$ and the sectional view cut by a plane normal to the plane of the drawing is FIG. 6A.

Figure 7:
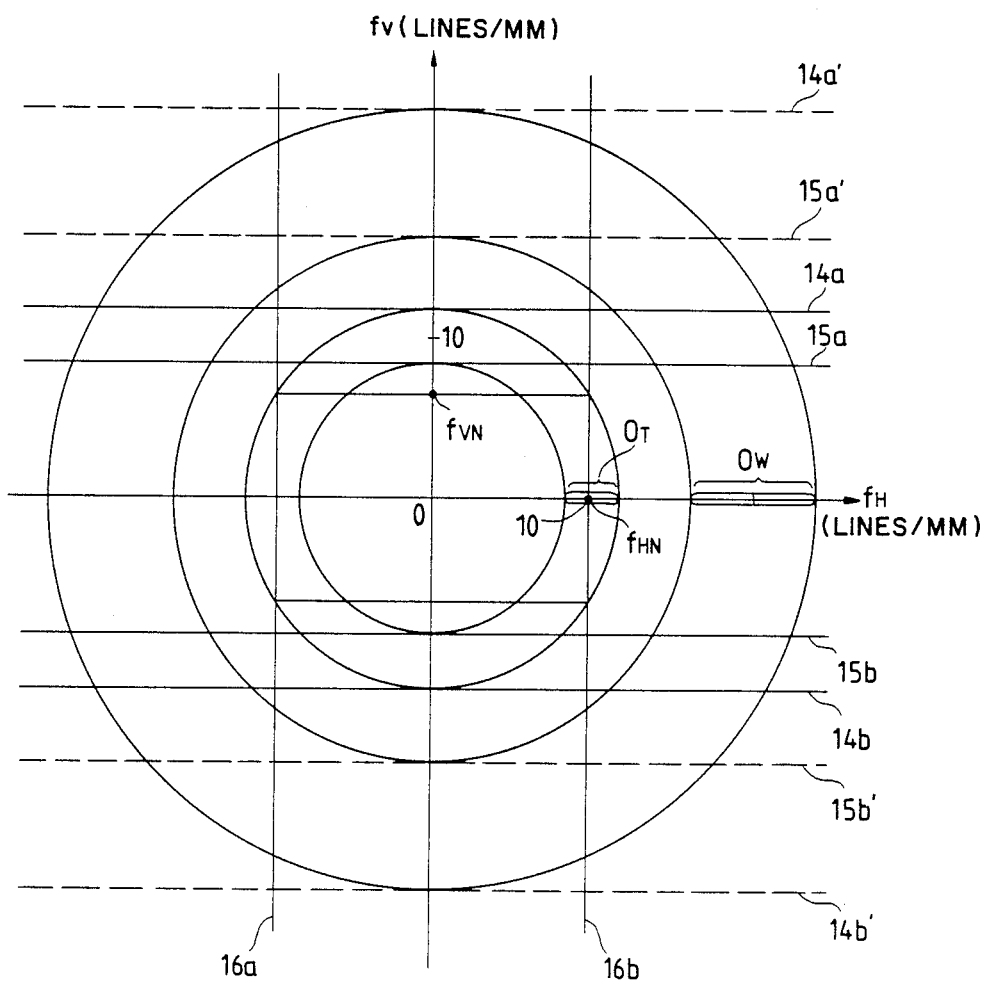
FIG. 7 is a diagram showing the spatial frequency response, represented by a two-dimensional spatial frequency plane, on an image surface in the first embodiment.

FIG. 7 shows a diagram representative of the spatial frequency response on the image surface in a drawing manner similar to FIG. 6B. An annular band $O_T$ located on the inside indicates an existence zone of the spatial frequency of cores of the image guide fiber bundle 11 on a telescopic side of the zoom lens and an annular band $O_W$ located on the outside is an existence zone of the spatial frequency of cores on a wide-angle side. In the zone on the telescopic side, a larger image (namely, thicker cores) is projected, so that the spatial frequency of cores is reduced as a matter of course. A rectangle located most inside is lines connected by horizontal and vertical Nyquist rates. The zone on the telescopic side is in a state just similar to FIG. 2.

The quartz plates 14, 15 of the first optical low-pass filter $F_1$ are designed to have proper thicknesses in such a way that lines exhibiting such frequencies that the response is reduced to zero in a vertical direction, that is, trap lines pass through the outer and inner ends of the spatial frequency band $O_T$ of cores in parallel with the horizontal axis (trap lines 14a, 14b are made by the single quartz plate 14 and trap lines 15a, 15b by the other single quartz plate 15).

Figure 8:
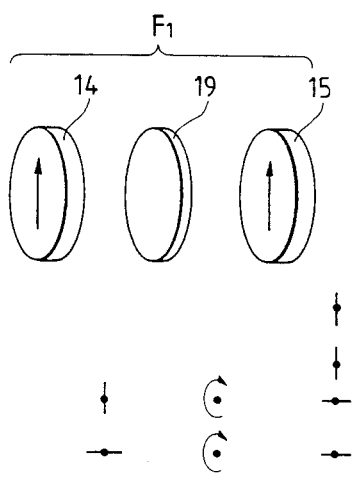
FIG. 8 is an exploded perspective view of a first optical low-pass filter in the first embodiment.

Further, with respect to a horizontal direction, the thickness of the quartz plate 16 of the second low-pass filter $F_2$ is properly determined in such a way that trap lines 16a, 16b pass through Nyquist rates $f_{HN}$, $f_{HN}$ in parallel with the vertical axis. A specific structure of the first optical low-pass filter $F_1$ is as shown in FIG. 8 and such that the quartz plates 14 and 15 splitting light in vertical directions indicated by arrows are cemented along with a $\frac{1}{4}\lambda$ plate 19 sandwiched between them. Thus, light of incidence is split into two rays of linearly polarized light (namely, an ordinary ray and an extraordinary ray) by the quartz plate 14. Further, each ray is converted to circularly polarized light by the $\frac{1}{4}$ λ plate 19 and then split into two rays of linearly polarized light by the quartz plate 15. The quartz plate 14 in which the amount of split of the light ray is smaller provides the trap lines 14a, 14b of higher frequencies, and the quartz plate 15 in which the amount is larger provides the trap lines 15a, 15b of lower frequencies.

Because the quartz plates 14, 15 are disposed on the entrance side of the imaging lens unit 12, the light ray splitting amount varies with the change of the imaging magnification caused by zooming of the lens unit. Accordingly, the relationship between the frequency band of cores and the trap line is constant even if the zooming is performed. That is, the trap lines 14a, 15a on the telescopic side change automatically to trap lines 14a', 15a' to pass through the outer and inner ends of the spatial frequency band $O_W$ of cores.

The second optical low-pass filter $F_2$ may be constructed from the single quartz plate 16 and is independent of the zooming, so that the trap lines 16a, 16b will always traverse the Nyquist rates $f_{HN}$, $f_{HN}$ Although, according to the present invention, moire can thus effectively be eliminated without reducing resolution, the trap lines 16a, 16b are completely separated from the spatial frequency band $O_W$ of cores in the horizontal direction in the case of the wide angle, with the result that the effect of eliminating the moiré is considerably weakened. Therefore, such is suitable for the zoom lens used principally on the telescopic side. For example, in the case where the image derived from an extremely fine endoscope such as a fiberscope for blood vessels is photographed by a TV camera with the zoom lens, the zoom lens is used only on the telescopic side because the image guide fiber bundle is fine. Thus, this embodiment is favorable for such an example.

Also, descriptions have been made that the spatial frequencies of cores of plural image guide fiber bundles exist somewhere in the annular frequency bands. However, image guide fiber bundle such that the orderliness of the fiber array is considerably unfavorable have come into use in recent years and, in such fiber bundles, a single image guide fiber bundle has various frequency components, so that some of the spatial frequencies of cores exist in the entire annular frequency band. The embodiment is also effective for such a case.

Although, in FIG. 4, the arrangement is made so that the foremost lens of the imaging lens unit 12 is the eyepiece and the first optical low-pass filter $F_1$ is disposed within the fiberscope, this embodiment may also be constructed so that all of the filters $F_1$, $F_2$ and the lens unit 12 are arranged in the camera and only the image guide fiber bundle can removably be attached to the camera.

Figure 2:
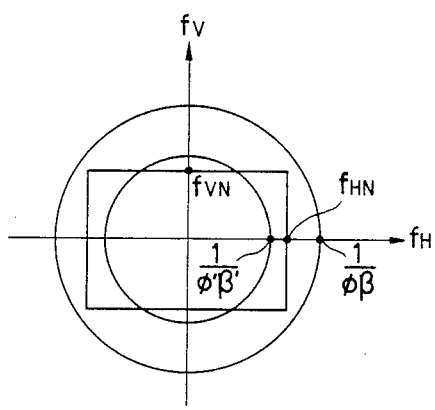
Figure 3:
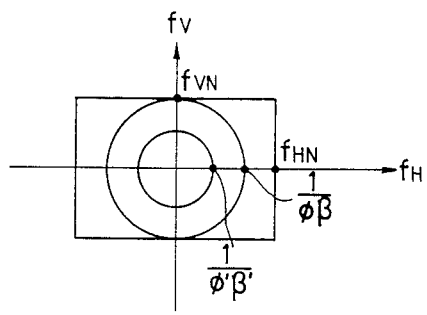

Further, although it is explained in the embodiment that the frequency relationship similar to FIG. 2, namely, the relationship of $f_{VN} < f_{IG} < f_{HN}$ is established, in the case where the Nyquist rate in the vertical direction is higher than that in the horizontal direction, that is, in the case where the relationship of $f_{HN} < f_{IG} < f_{VN}$ is established, it is evident that the same discussion is caused by changing the vertical direction for the horizontal direction in the explanation of the embodiment.

Figure 9:
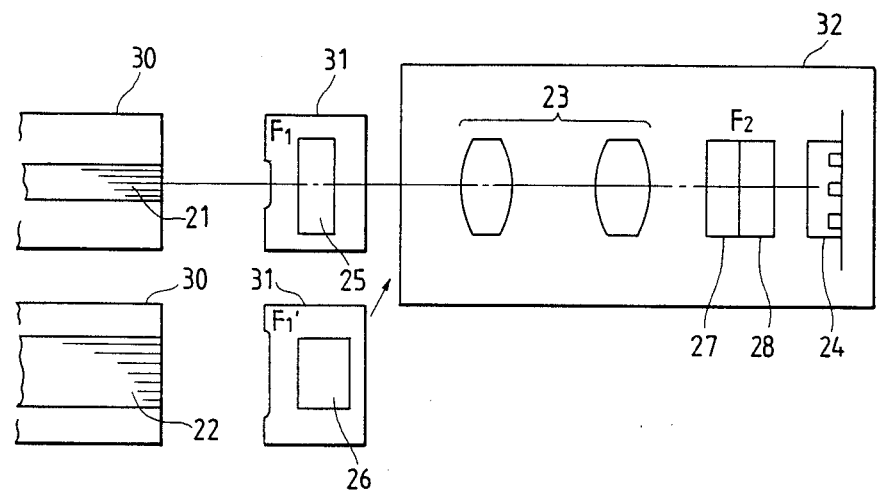
FIG. 9 is a schematic view showing the optical system of a second embodiment of the present invention.
Figure 10:
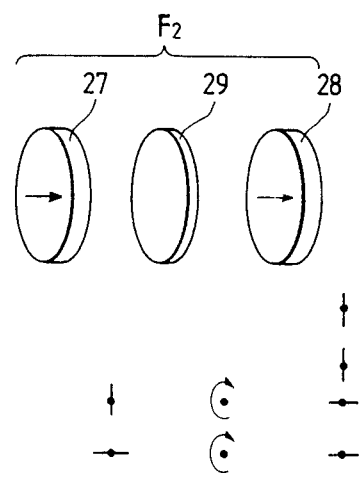
FIG. 10 is an exploded perspective view of a second optical low-pass filter in the second embodiment.

FIG. 9 shows a second embodiment, in which two fiberscopes having image guide fiber bundles which assume disorderly arrays of fibers and are different in effective diameter from each other are selectively mounted to the same TV camera with invariable imaging magnification for use. Reference numeral 21 designates an image guide fiber bundle whose effective and core diameters are small, 22 an image guide fiber bundle whose effective and core diameters are large, 23 an imaging lens unit with constant magnification, and 24 a solid-state image pickup device arranged at an imaging surface of the imaging lens unit 23. Reference symbols $F_1$, $F_1'$ designate first optical low-pass filters with small and large light ray splitting amounts, arranged between the image guide fiber bundles 21, 22 and the imaging lens unit 23, respectively, and $F_2$ a second optical low-pass filter arranged between the imaging lens unit 23 and the solid-state image pickup device 24. The first optical low-pass filters $F_1$, $F_1'$ are constructed from quartz plates 25, 26, respectively, and the second optical low-pass filter $F_2$ is such that two quartz plates 27, 28 splitting the light in horizontal directions indicated by arrows as shown in FIG. 10 are cemented along with a $\frac{1}{4}\lambda$ plate 29 sandwiched between them. The light of incidence is split into two rays of linearly polarized light (namely, an ordinary ray and an extraordinary ray) by the quartz plate 27, and each ray is converted to circularly polarized light by the $\frac{1}{4}\lambda$ plate 29 and then split into two rays of lineally polarized light by the quartz plate 28. The image guide fiber bundles 21, 22 are arranged in fiberscopes 30, 30, respectively, the first optical low-pass filters $F_1$, $F_1'$ in adapters 31, 31, respectively, and the imaging lens unit 23, the second optical low-pass filter $F_2$ and the solid-state image pickup device 24 in a TV camera 32.

Figure 11:
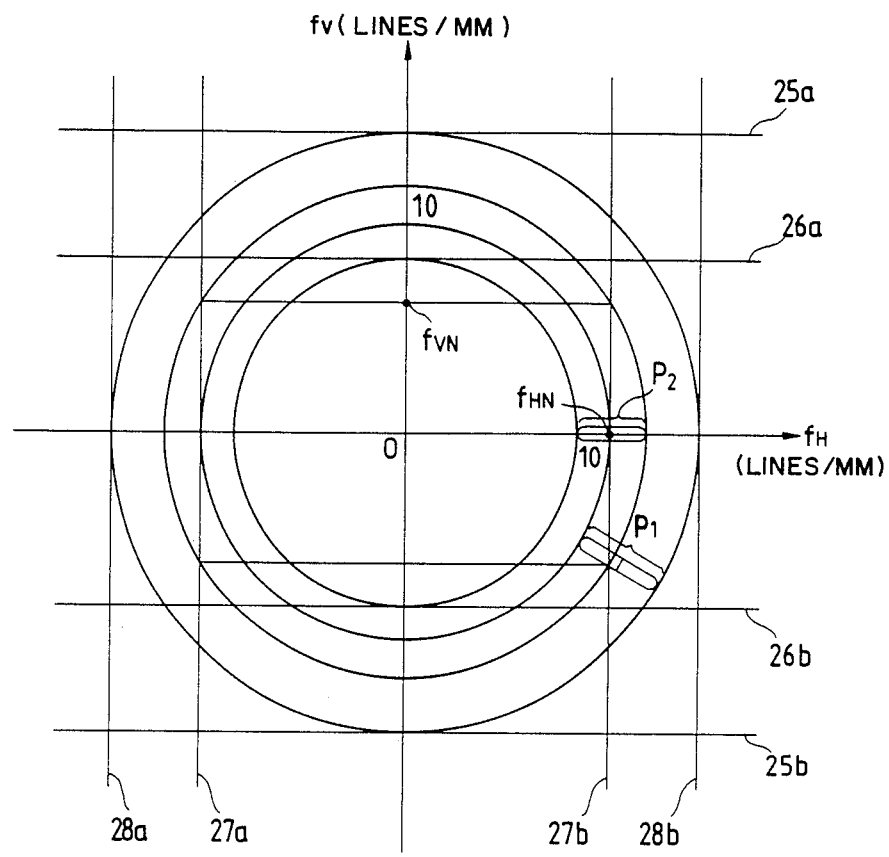
FIG. 11 is a diagram showing the spatial frequency response, represented by a two-dimensional spatial frequency plane, on an image surface in the second embodiment.

FIG. 11 shows a diagram representative of the spatial frequency response on the image surface in the embodiment by the two-dimensional spatial frequency plane, in which reference symbols $P_1$ and $P_2$ represent spatial frequency bands of core of the image guide fiber bundles 21 and 22, respectively, numerals 25a, 25b and 26a, 26b trap lines made by the quartz plates 25 and 26 of the first optical low-pass filters $F_1$, $F_1'$, respectively, and 27a, 27b and 28a, 28b trap lines made by the quartz plates 27, 28 of the second optical low-pass filter $F_2$, respectively. The trap lines 25a, 25b pass through the outer end of the spatial frequency band $P_1$ of cores of the image guide fiber bundle 21, while the trap lines 26a, 26b traverse the inner end of the spatial frequency band $P_2$ of cores of the image guide fiber bundle 22. Further, the trap lines 27a, 27b pass through the Nyquist rates $f_{HN}' - f_{HN}$.

Therefore, according to the embodiment, in the case where plural fiberscopes having the image guide fiber bundles different from each other in spatial frequency of cores are selectively mounted to the same TV camera with invariable imaging magnification for use, the first optical low-pass filters accommodating respective spatial frequencies are selected and used as adapters, thereby being capable of eliminating effectively moiré without sacrificing resolution.

Figure 12:
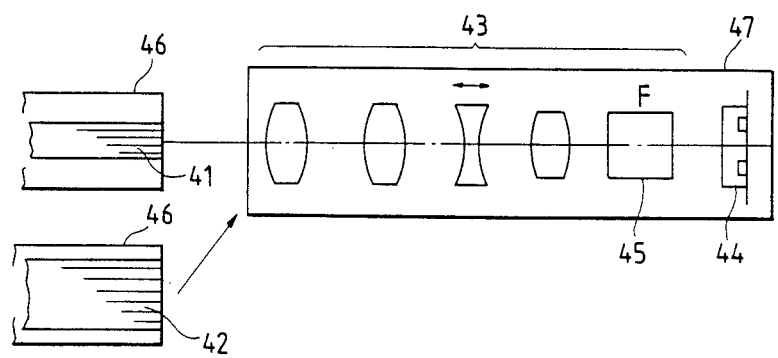
FIG. 12 is a schematic view showing the optical system of a third embodiment of the present invention.

FIG. 12 depicts a third embodiment, which is such that two fiberscopes having an image guide fiber bundle which is small in effective diameter and disordered in fiber array and an image guide fiber bundle which is large in effective diameter and ordered in fiber array are selectively attached to the same TV camera with variable imaging magnification for use. Reference numeral 41 represents an image guide fiber bundle which has a small effective diameter and assumes a disordered array of fibers, that is, which is random in core diameter within the range of $\phi_1 \sim \phi_{1'}$, 42 an image guide fiber bundle which is somewhat larger in effective diameter and has an ordered array of fibers, that is, which is constant in core diameter as $\phi_2$, 43 an imaging lens unit which serves as a zoom lens, and 44 a solid-state image pickup device arranged at the imaging surface of the imaging lens unit 43. Reference symbol F represents an optical low-pass filter arranged between the imaging lens unit 43 and the solid-state image pickup device 44, which comprises at least one quartz plate 45. The image guide fiber bundles 41, 42 are arranged in the fiberscopes 46, 46, respectively, and the imaging lens unit 43, the optical low-pass filter F and the solid-state image pickup device 44 are disposed in a TV camera 47.

Here, when the distance between pixel elements in the horizontal direction of the solid-state image pickup device 44 is represented by $P_H$, the value of $$\frac{1}{2} \cdot \frac{1}{2P_H}$$

becomes the Nyquist rate. Further, if the core diameters of the image guide fiber bundles 41, 42 and the imaging magnification of the imaging lens unit 43 are selected so that the equation:

$$\frac{1}{2} \cdot \frac{1}{2P_H} \approx \frac{1}{\phi_1 \beta_T} \approx \frac{1}{\phi_{1'} \beta_T} \approx \frac{1}{\phi_2 \beta_W}$$

is established when the imaging magnification of the imaging lens unit 43 is assumed to range from $\beta_W$ (in a wide-angle state) to $\beta_T$ (in a telescopic state), the split of the light ray in the horizontal direction becomes unnecessary and therefore it is necessary only to split the light ray in the vertical direction through the optical low-pass filter on the side of the solid-state image pickup device 44.

Figure 13:
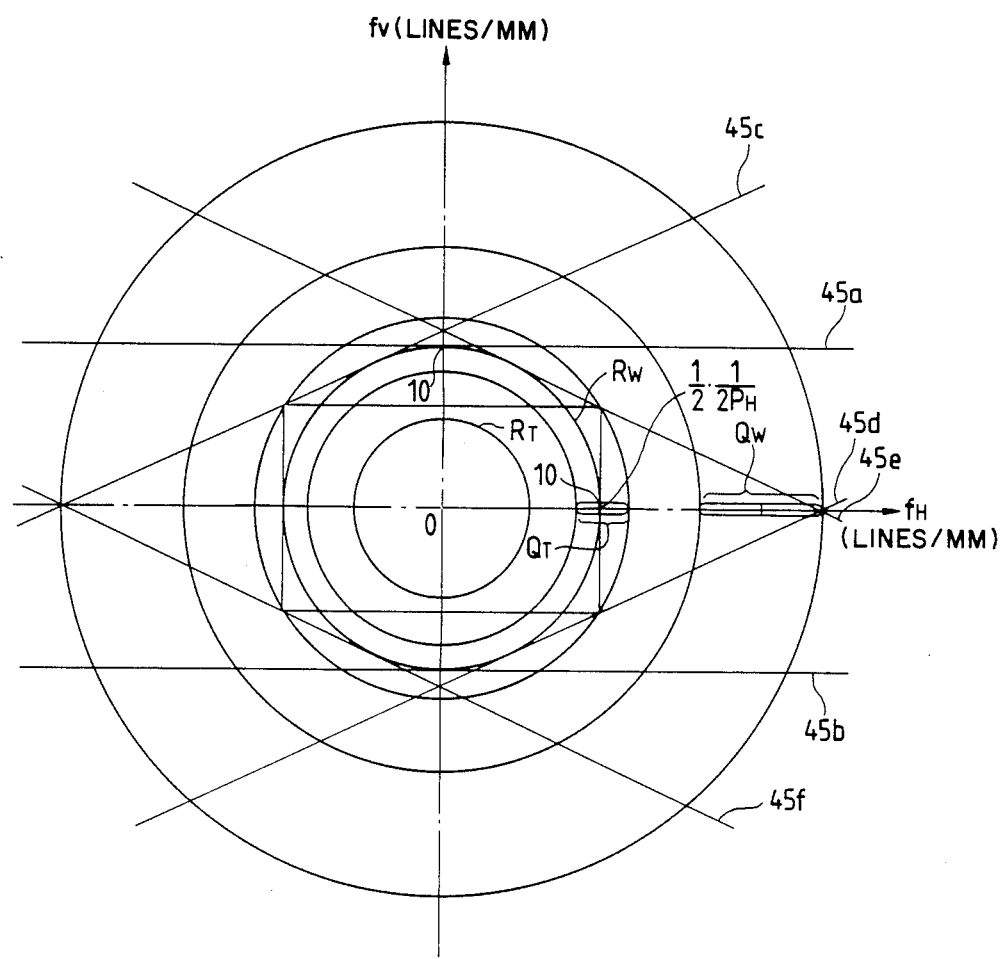
FIG. 13 is a diagram showing the spatial frequency response, represented by a two-dimensional spatial frequency plane, on an image surface in the third embodiment.
Figure 14:
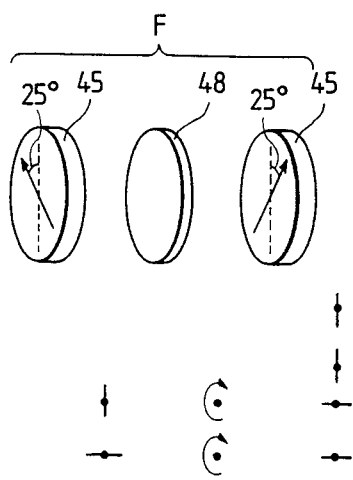
FIG. 14 is an exploded perspective view of an optical low-pass filter in the third embodiment.

FIG. 13 shows a diagram representative of the spatial frequency response on the image surface in this embodiment by the two-dimensional spatial frequency plane, in which reference symbols $Q_W$ and $Q_T$ denote spatial frequency bands of cores on the wide-angle and telescopic sides of the image guide fiber bundle 41, respectively, $R_W$ and $R_T$ spatial frequency components of cores on the wide-angle and telescopic side of the image guide fiber bundle 42, numerals 45a, and 45b trap lines made by the quartz plate 45 in the case where the optical low-pass filter F comprises the quartz plates 45 having the light ray splitting direction of an angle of 90° with respect to the horizontal axis, and 45c, 45d and 45e, 45f trap lines made, in the case where the optical low-pass filter F comprises two quartz plates 45 having the splitting directions of angles of 90°±25° indicated by arrows with respect to the horizontal axis as shown in FIG. 14 and a $\frac{1}{4}\lambda$ plate 48, by the quartz plates 45. The light of incidence is split into two rays of linearly polarized light (namely, an ordinary ray and an extraordinary ray) by the front quartz plate 45, and each ray is converted to circularly polarized light by the $\frac{1}{4}\lambda$ plate 48 and then split into two rays of linearly polarized light by the rear quartz plate 45. Also, the $\frac{1}{4}\lambda$ plate 48 may be omitted. Any of the trap lines 45a, 45b, 45c, 45d, 45e and 45f traverses the spatial frequency band $Q_T$ and the spatial frequency component $R_W$. Further, the Nyquist rate $$\frac{1}{2} \cdot \left(\frac{1}{2P_H}\right)$$

is such as to be given by $$\frac{1}{2} \cdot \left(\frac{1}{2P_H}\right) \approx Q_T \approx R_W.$$

Thus, according to the embodiment, when a zoom ratio is determined so that the spatial frequency on the image surface located on the telescopic side in the use of the small-diameter image guide fiber bundle is substantially equivalent to that on the wide-angle side in the use of the large-diameter image guide fiber bundle and the imaging magnification is set so that these equivalent spatial frequencies are below the Nyquist rate depending on the solid-state image pickup device, moiré can effectively be removed without reducing resolution only by providing the optical low-pass filter used in common on the side of the solid-state image pickup device of the imaging optical system.

Figure 15:
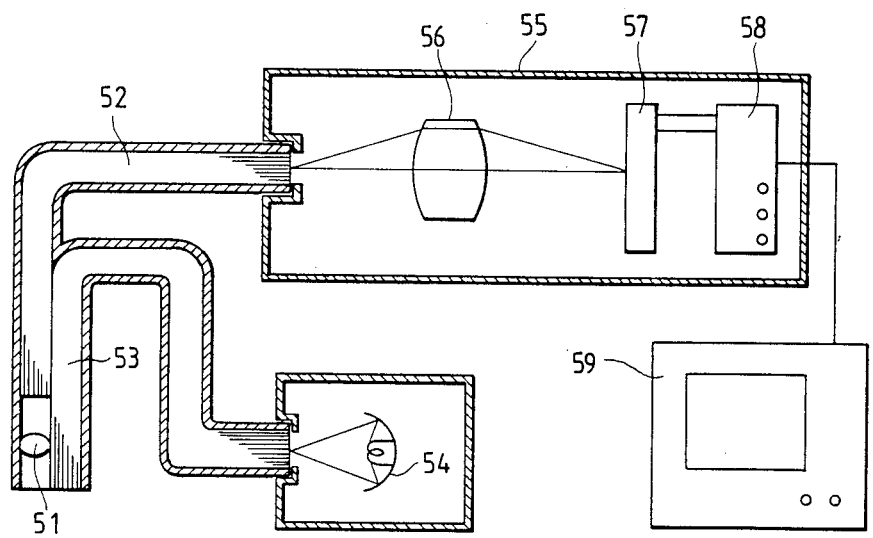
FIG. 15 is a view showing an arrangement of the image pickup system for endoscopes according to the present invention.

Also, the arrangement of the image pickup system for endoscopes may be such as to be shown in FIG. 15. Specifically, the endoscope is equipped with an objective lens 51 forming an image of an object, an image guide fiber bundle 52 transmitting the object image, and a light guide fiber bundle 53 transferring illumination light to the distal end portion of the endoscope so that the exit end of the image guide fiber bundle 52 is removably attached to a camera control unit 55 and the entrance end of the light guide fiber bundle 53 is removably mounted to a light source device 54. Further, the camera control unit 55 is provided with an imaging lens 56, a solid-state image pickup device 57 and a controller 58 performing various signal and image processings. Reference numeral 59 represents a monitor television.

In this system, the illumination light emitted from a light source illuminates the object through the light guide fiber bundle 53 and the object image appearing on the exit end of the image guide fiber bundle 52 is re-formed onto the solid-state image pickup device 57 by the imaging lens 56. A signal indicative of the object image derived from the solid-state image pickup device 57 is displayed on the monitor television 59 after a predetermined processing.

The system of this type, in which the endoscope does not include the eyepiece, is suitable to such an endoscope for throwaway as used in the case where the observation in blood vessels is performed.

As stated above, the image pickup device according to the present invention, when plural fiberscopes having the image guide fiber bundles different in effective diameter and core diameter are selectively mounted to the same camera having the imaging optical system with variable or invariable imaging magnification for observation on the TV monitor, has an important advantage in practical use that the generation of moiré can be prevented without sacrificing resolution. Also, it has a further advantage that the effect is brought about even in the case where the image guide fiber bundle assumes a disordered array of fibers.

What is claimed is:

1. An image pickup system for endoscopes comprising:
    an endoscope provided with an objective lens arranged at a tip portion, an image guide fiber bundle, and a light guide fiber bundle;
    a light source attached removably to an entrance end of said light guide fiber bundle;
    a camera control unit to which an exit end of said image guide fiber bundle is removably attached, having a solid-state image pickup device, an imaging lens unit forming an image of an object appearing on an exit end face of said image guide fiber bundle directly onto said solid-state image pickup device when said image guide fiber bundle is attached, and a signal processing circuit applying a predetermined processing to an output signal issued from said solid-state image pickup device; and
    a monitor television displaying the object image in accordance with an output of said signal processing circuit,
    optical low-pass filter means being provided in an optical path from the exit end face of said image guide fiber bundle to said solid-state image pickup device.

2. An image pickup system for endoscopes comprising an objective lens forming an image of an object; an image guide fiber bundle transmitting the object image formed by the objective lens; and an imaging lens unit reforming the object image appearing on an exit end face of the image guide fiber bundle onto a solid-state image pickup device, wherein a first optical low-pass filter having a spatial frequency response depending on an array of fibers of said image guide fiber bundle and a second optical low-pass filter having a spatial frequency response depending on a sampling frequency of said solid-state image pickup device being provided in an imaging optical path from the exit end face of said image guide fiber bundle to said solid- state image pickup device.

3. An image pickup system for endoscopes comprising:
    an endoscope provided with an objective lens arranged at a tip portion, an image guide fiber bundle, and a light guide fiber bundle;
    a light source attached removably to an entrance end of said light guide fiber bundle;
    a camera control unit to which an exit end of said image guide fiber bundle is removably attached, having a solid-state image pickup device, an imaging lens unit forming an image of an object appearing on an exit end face of said image guide fiber bundle onto said solid-state image pickup device when said image guide fiber bundle is attached, and a signal processing circuit applying a predetermined processing to an output signal issued from said solid-state image pickup device; and
    a monitor television displaying the object image in accordance with an output of said signal processing circuit,
    optical low-pass filter means being provided in an optical path from the exit end face of said image guide fiber bundle to said solid-state image pickup device, wherein said optical low-pass filter means includes a first optical low-pass filter having a spatial frequency response depending on an array of fibers of said image guide fiber bundle and a second optical low-pass filter having a spatial frequency response depending on a sampling frequency of said solid-state image pickup device.

4. An image pickup system according to claim 2, wherein said objective lens and said image guide fiber bundle are incorporated in an endoscope.

5. An image pickup system according to claim 4 or 3, wherein said imaging lens unit includes a variable power lens and said first optical low-pass filter is arranged on an object side of said variable power lens.

6. An image pickup system according to claim 4 or 3, wherein said image guide fiber bundle comprises a random fiber bundle.

7. An image pickup system according to claim 4, wherein said imaging lens unit, said solid-state image pickup device, said first optical low-pass filter, and said second optical low-pass filter are incorporated in a TV camera, and said endoscope and said TV camera are constructed to be removably attached to each other.

8. An image pickup system according to claim 3 or 7, wherein said endoscope comprises plural endoscopes, one of said plural endoscopes being selectively removably attached to one of said TV camera and said camera control unit, and individual image guide fiber bundles incorporated in said plural endoscopes being different from each other in thickness.

9. An image pickup system according to claim 8, wherein spatial frequencies depending on the array of fibers of said individual image guide fiber bundles incorporated in said plural endoscopes are different from each other.

10. An image pickup system according to claim 8, wherein one of said individual image guide fiber bundles incorporated in said plural endoscopes is a random fiber bundle, others of said bundles being thicker than said random fiber bundle and have an ordered array of fibers, and said imaging lens unit includes a variable power lens.

11. An image pickup system according to claim 4 or 3, wherein, when a Nyquist rate in a vertical direction of said solid state image pickup device is represented by $f_{VN}$, a Nyquist rate in a horizontal direction by $f_{HN}$, and a spatial frequency depending on an array of cores in an image of the image guide fiber bundle on said solid-state image pickup device by $f_{IG}$, a frequency relationship given by $$f_{VN} < f_{IG} < f_{HN}$$

is established, said first optical low-pass filter causes the spatial frequency response in the vertical direction to be reduced, and said second optical low-pass filter causes the Nyquist rate in the horizontal direction to be reduced.

12. An image pickup system according to claim 4 or 3, wherein, when a Nyquist rate in a vertical direction of said solid-state image pickup device is represented by $f_{VN}$, a Nyquist rate in a horizontal direction by $f_{HN}$, and a spatial frequency depending on an array of cores in an image of the image guide fiber bundle on said solid-state image pickup device by $f_{IG}$, a frequency relationship given by $$f_{HN} < f_{IG} < f_{VN}$$

is established, said first optical low-pass filter causes the spatial frequency response in the horizontal direction to be reduced, and said second optical low-pass filter causes the Nyquist rate in the vertical direction to be reduced.

13. An image pickup system according to claim 4 or 3, wherein said endoscope comprises plural endoscopes which incorporate individual image guide fiber bundles different in thickness from each other and which are usable in combination with one of said image pickup device and said image pickup system for endoscopes, and plural optical low-pass filters comprising said first optical low-pass filter and another first optical low-pass filter are provided so that one of said plural optical low-pass filters is selectively used in accordance with the spatial frequency response depending on the array of fibers of the image guide fiber bundle incorporated in each of said plural endoscopes which is used in combination with one of said image pickup device and said image pickup system for endoscopes.

14. An image pickup system according to claim 13, wherein each of said plural optical low-pass filters is arranged between said image guide fiber bundle and said imaging lens unit.

15. An image pickup system according to claim 5, wherein said endoscope comprises plural endoscopes, one of which incorporates a fine image guide fiber bundle and the other of which incorporates a thicker image guide fiber bundle; a variable power ratio of said variable power lens is set so that the spatial frequency of cores in an image formed on the solid-state image pickup device in maximum magnification of the variable power lens in the use of the fine image guide fiber bundle is substantially equal to that in minimum magnification of the variable power lens in the use of the thicker image guide fiber bundle; and imaging magnification of said variable power lens is set so that these equal spatial frequencies are below a Nyquist rate of the solid-state image pickup device.

16. An image pickup system according to claim 4 or 3, wherein said solid-state image pickup device is provided with a color encoding filter comprising numerous color elements of primary colors arrayed in front of said solid-state image pickup device and, when a Nyquist rate of color sampling depending on an array of the color elements of the filter is represented by $f_{PNC}$, a Nyquist rate of the same color in a direction normal thereto by $f_{SNC}$, and a spatial frequency depending on an array of cores in an image of the image guide fiber bundle formed on the solid-state image pickup device by $f_{IG}$, a frequency relationship expressed by $$f_{SNC} < f_{IG} < f_{PNC}$$

is established.

17. An image pickup system according to claim 4 or 3, wherein said solid-state image pickup device is provided with a color encoding filter comprising numerous color elements of primary colors arranged in front of said solid-state image pickup device and, when a Nyquist rate of color sampling depending on an array of the color element of the filter is represented by $f_{PNC}$, a Nyquist rate of the same color in a direction normal thereto by $f_{SNC}$, and a spatial frequency depending on an array of cores in an image of the image guide fiber bundle formed on the solid-state image pickup device by $f_{IG}$, a frequency relationship expressed by $$f_{PNC} < f_{IG} < f_{SNC}$$

is established.

* * * * *